(12) United States Patent
Yanagida et al.

(10) Patent No.: US 11,177,538 B2
(45) Date of Patent: Nov. 16, 2021

(54) WIRING MODULE AND POWER STORAGE MODULE

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Taiji Yanagida, Mie (JP); Hiroki Shimoda, Mie (JP); Yoshinori Ito, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(*) Notice: Subject to any disclaimer, the term of this patent is extended or adjusted under 35 U.S.C. 154(b) by 188 days.

(21) Appl. No.: 16/418,099

(22) Filed: May 21, 2019

(65) Prior Publication Data
US 2019/0372076 A1    Dec. 5, 2019

(30) Foreign Application Priority Data
May 30, 2018   (JP) .............................. JP2018-103600

(51) Int. Cl.
*H01M 2/20*    (2006.01)
*H01M 2/10*    (2006.01)
(Continued)

(52) U.S. Cl.
CPC ....... *H01M 50/502* (2021.01); *H01M 10/425* (2013.01); *H01M 10/482* (2013.01); *H01M 50/20* (2021.01); *H01M 50/531* (2021.01); *H01M 50/572* (2021.01); *H01M 2220/20* (2013.01)

(58) Field of Classification Search
CPC .... H01M 10/425; H01M 10/482; H01M 2/26; H01M 2/34; H01M 2/206; H01M 2/1077; H01M 2220/20; H01M 50/531; H01M 50/572; H01M 50/20
See application file for complete search history.

(56) References Cited

U.S. PATENT DOCUMENTS

2016/0254515 A1* 9/2016 Shimoda ............... H01M 2/206
429/61

FOREIGN PATENT DOCUMENTS

JP    2011-008957    1/2011
JP    2016-207584    12/2016

* cited by examiner

*Primary Examiner* — Osei K Amponsah
(74) *Attorney, Agent, or Firm* — Greenblum & Bernstein, P.L.C.

(57) ABSTRACT

The reliability of electrical connection between electrode terminals of power storage devices and bus bars can be improved. A bent portion that is provided on each bus bar is formed at a position shifted in the left-right direction from an intermediate position between one contact portion of two contact portions of the bus bar and the other contact portion positioned next to the one contact portion. In a bus bar housing portion, a beam portion on which a corresponding bus bar is placed is formed extending in the front-rear direction. Each beam portion is formed at a position shifted in the left-right direction from the bent portion in a state where the bus bar is housed in the bus bar housing portion.

5 Claims, 6 Drawing Sheets

(51) Int. Cl.
*H01M 2/26* (2006.01)
*H01M 10/42* (2006.01)
*H01M 10/48* (2006.01)
*H01M 2/34* (2006.01)
*H01M 50/502* (2021.01)
*H01M 50/20* (2021.01)
*H01M 50/531* (2021.01)
*H01M 50/572* (2021.01)

[FIG. 5]
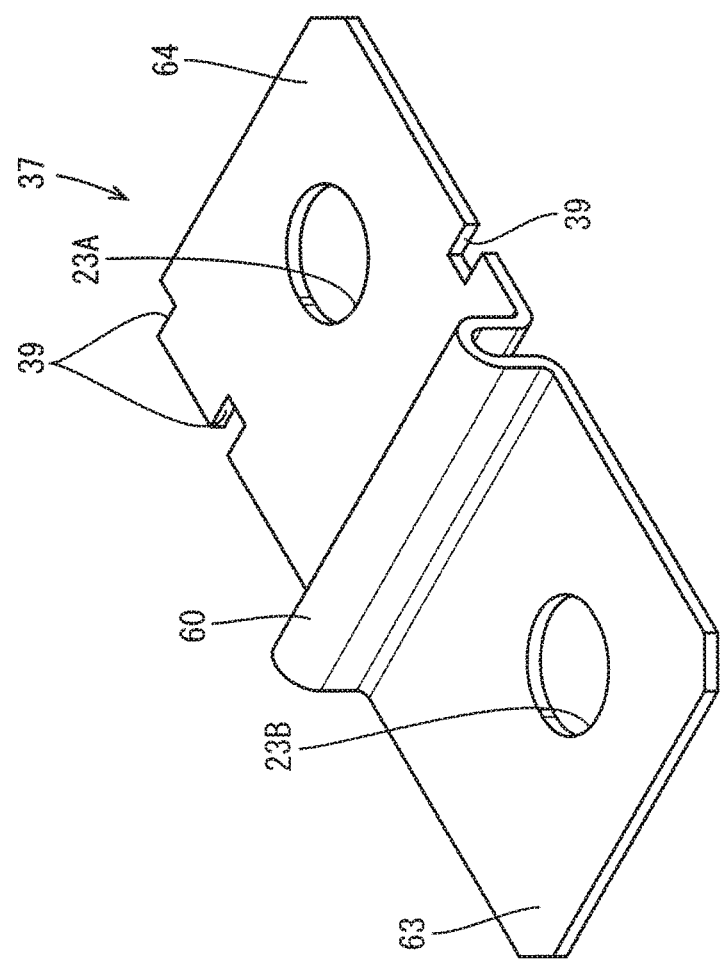

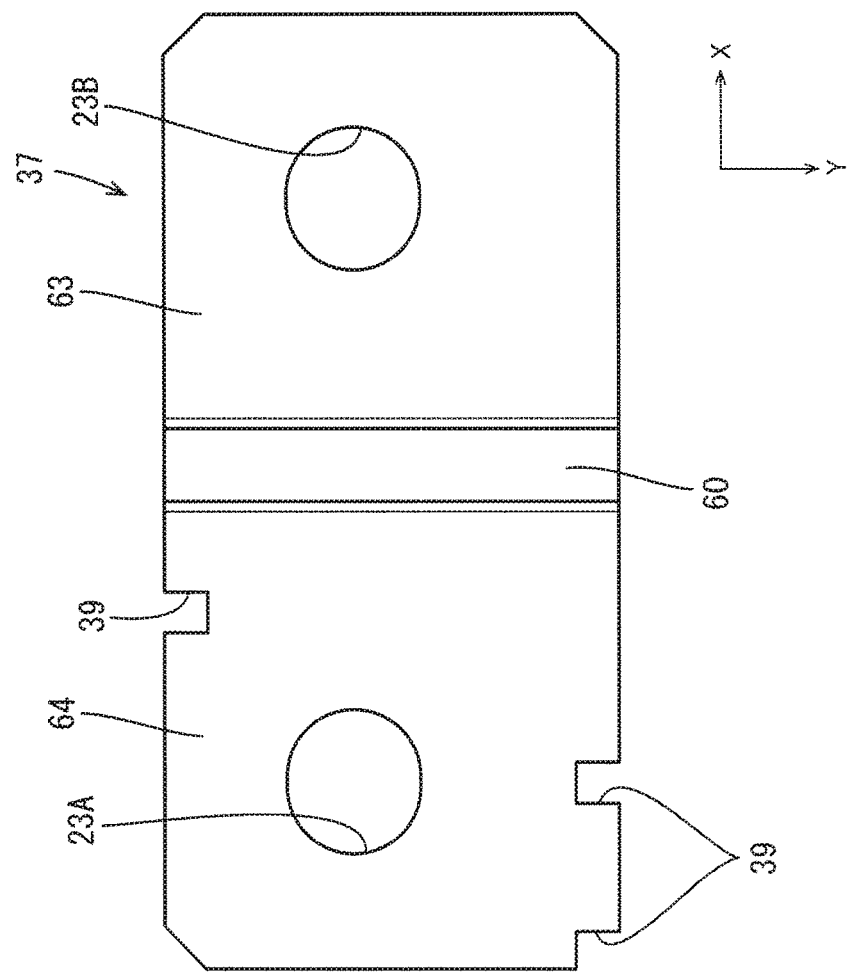

WIRING MODULE AND POWER STORAGE MODULE

TECHNICAL FIELD

The technology disclosed in the present specification relates to a wiring module and a power storage module.

BACKGROUND ART

The technology disclosed in JP 2016-207584A is known as a structure for electrically connecting a plurality of power storage devices. With the above-mentioned technology, the plurality of power storage devices each having electrode terminals are connected to each other by bus bars. Each bus bar has a plurality of terminal portions that are formed in a plate shape and have contact surfaces that come into contact with respective electrode terminals of the plurality of power storage devices and that are separated in a direction running along the contact surfaces, and a bridge portion that extends between the two terminal portions in a bent state with a portion positioned away from the contact surfaces in a direction intersecting with the contact surfaces.

With the above-described technology, when an external force such as impact and vibration is applied to the power storage device group, stress is alleviated by the bent portion of the bridge portion, and thus stress is locally mitigated.

However, with the above-described technology, the electrode terminals need to be individually connected with bus bars. Accordingly, extremely troublesome work of connecting electrode terminals with bus bars needs to be repeated.

As disclosed in JP 2011-8957A, a technology for arranging a wiring module that has bus bars and at insulating protector that has a plurality of bus bar holding portions that each hold a bus bar on a power storage device group is known as a technology for solving the above-described issue.

With the above-described technology, when the electrode terminals are connected to each other, the wiring module may be attached to the power storage device group. Accordingly, the attachment work for connecting the portions between the electrode terminals can be simplified.

JP 2016-207584A and JP 2011-8957A are examples of related art.

SUMMARY OF THE INVENTION

However, a simple combination of the technologies disclosed in JP 2016-207584A and JP 2011-8957A may cause the following problem.

Each bridge portion that is formed in the bus bar, which is disclosed in JP 2016-207584A, is provided at the intermediate portion of two adjacent through-holes formed in the bus bar. On the other hand, each bus bar holding portion that is formed in the insulating protector, which is disclosed in JP 2011-8957A, is provided with a beam portion on which the bus bar is placed at the position corresponding to the intermediate position of two adjacent through-holes formed in the bus bar.

For this reason, if the bus bar disclosed in JP 2016-207584A is placed on the bus bar holding portion that is formed in the insulating protector disclosed in JP 2011-8957A, the bus bar holding portion enters the bridge portion of the bus bar. As a result, the height positions of the contact portions of the bus bar with respect to the electrode terminal of the power storage device cannot be accurately set. Therefore, there arises a problem that the reliability of electrical connection between the electrode terminals of the power storage devices and the bus bars decreases.

The technology disclosed in the present specification was achieved in light of the above-described circumstances, and it is an object of the present invention to improve the reliability of electrical connection between electrode terminals of power storage devices and bus bars.

One aspect of the technology disclosed in the present specification is a wiring module that is to be arranged on a power storage device group in which a plurality of power storage devices each having electrode terminals are arranged side-by-side along an alignment direction, the wiring module including: bus bars that are connected to the electrode terminals; and an insulating protector that is made of a synthetic resin and has bus bar housing portions into which the bus bars are housed, wherein each of the bus bars includes: a plurality of contact portions that each come into contact with a corresponding electrode terminal; and a bent portion that is bent in a direction away from the contact portions and extends in an intersecting direction that intersects with the alignment direction, each of the bent portions is formed at a position shifted in the alignment direction from an intermediate position between one contact portion of the plurality of contact portions and another contact portion next to the one contact portion, a beam portion on which a corresponding bus bar is placed is formed in each of the bus bar housing portions to extend in the intersecting direction, and the beam portion is formed at a position shifted from the bent portion in the alignment direction.

Also, the technology disclosed in the present specification is a power storage module that includes a power storage device group in which a plurality of power storage devices each having electrode terminals are arranged in an alignment direction, and a wiring module that is arranged on the power storage device group.

With the above-described configuration, each of the bus bars is placed on the beam portion in a well-balanced manner. In this manner, the height positions of the contact portions of the bus bar can be accurately set with the beam portion. As a result, the reliability of electrical connection between the electrode terminals and the bus bars can be improved.

The following embodiments are preferable as embodiments of the technology described in the present specification.

Each of the beam portions is provided at a position corresponding to the intermediate position between the one contact portion and the other contact portion in a state where the bus bar is housed in the bus bar housing portion.

With the above-described configuration, the bus bar can be placed on the beam portion in a more balanced manner. Accordingly, the reliability of electrical connection between the electrode terminals and the bus bars can be further improved.

Each of the bus bars has a plurality of through-holes, and each of the bent portions is formed at a position shifted in the alignment direction from an intermediate position between the center of one through-hole of the plurality of through-holes and the center of another through-hole positioned next to the one through-hole.

With the above-described configuration, the position of the bent portion in the bus bar can be set with reference to the center positions of the through-holes, and thus the position accuracy of the bent portion can be improved. In this manner, the position accuracy between the bus bar and the beam portion can be improved, and thus the reliability of electrical connection between the electrode terminals and the bus bars can be further improved.

A first region and a second region that has a larger area than the first region are formed in a region different from the bent portion on a surface of each of the bus bars opposite to the surface on which the contact portions are formed, a voltage detection terminal is placed on each of the second regions, and each of the voltage detection terminals has a bus bar connection portion that is electrically connected to the bus bar and a wire connection portion that extends laterally from a side edge of the bus bar connection portion and is connected to a voltage detection wire.

With the above-described configuration, the surface of each of the bus bars opposite to the surface on which the contact portions are formed is divided into the first region and the second region that has a larger area than the first region due to the bent portion. The voltage detection terminal having a configuration in which the wire connection portion extends laterally from the side edge of the bus bar connection portion can be arranged in the second region.

With the technology disclosed in the present specification, the reliability of electrical connection between the electrode terminals of the power storage devices and the bus bars can be improved.

BRIEF DESCRIPTION OF THE DRAWINGS

FIG. 5 is a perspective view showing a bus bar.

FIG. 6 is a plan view showing the bus bar.

EMBODIMENTS OF THE INVENTION

Embodiment 1

Figure 1:
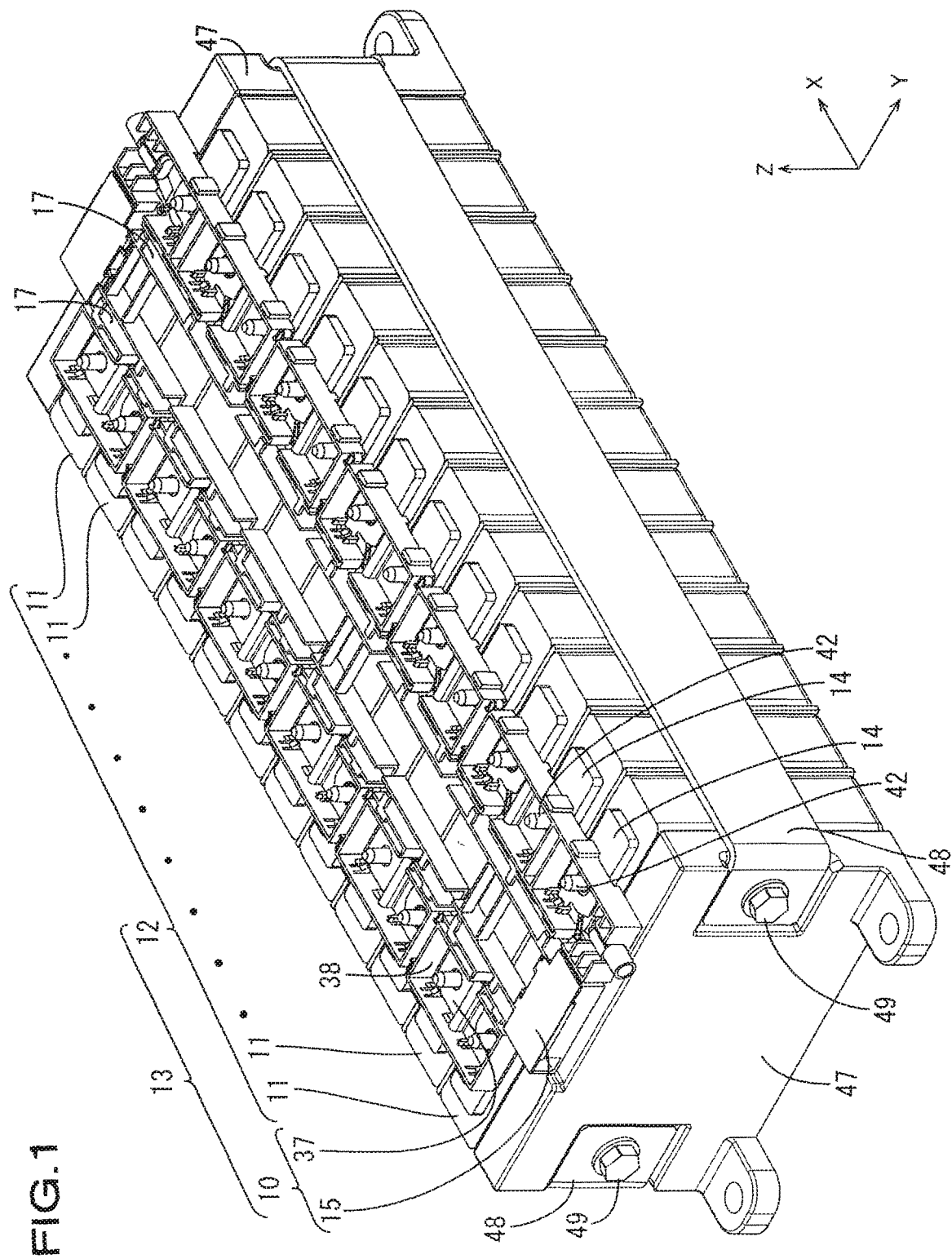
FIG. 1 is a perspective view of a power storage module according to Embodiment 1.

Embodiment 1 of the technology disclosed in the present specification will be described with reference to FIGS. 1 to 6. A wiring module 10 according to the present embodiment constitutes a power storage module 13 by being attached to a power storage device group 12, which is a plurality of power storage devices (twelve in the present embodiment) 11 that are arranged side-by-side. The power storage module 13 is installed in a vehicle (not shown) such as an electric automobile or a hybrid automobile, and is used as a motive power source for driving the vehicle. In the description below, a description is given in which the Z direction is the upward direction, the Y direction is the forward direction, and the X direction is the leftward direction. Also, there may be cases where, for a plurality of the same members, a reference number is assigned to some of them and not assigned to the other members.

Power Storage Device 11

Each of the power storage devices 11 according to the present embodiment is a secondary battery. Power storage elements (not shown) are housed in the power storage devices 11. The power storage devices 11 have a substantially rectangular parallelepiped shape. A pair of electrode terminals 14 are provided on the upper surface of each power storage device 11 at positions close to the two end portions in the front-rear direction, respectively. One electrode terminal 14 is a positive terminal and the other is a negative terminal. On the upper surface of each electrode terminal 14, a stud bolt 42 that has a screw thread formed on its outer circumferential surface is provided protruding upward.

The power storage device group 12 is formed by arranging a plurality of power storage devices 11, in which electrode terminals 14 with different polarities are adjacent to each other, in the left-right direction (an example of an alignment direction).

A pair of end plates 47 are arranged on the left and right end portions of the power storage device group 12. The pair of end plates 47 are held between a pair of sandwiching plates 48 that are disposed on the front and rear side surfaces of the power storage device group 12 and fixed to the end plates 47 using bolts 49.

Wiring Module 10

As shown in FIG. 1, the wiring module 10 is attached to the upper surface of the power storage device group 12. Overall, the wiring module 10 is elongated in the left-right direction.

As shown in FIG. 1, the wiring module 10 includes a plurality of bus bars 37 and an insulating protector 15 that has a plurality of bus bar housing portions 38 each housing a bus bar 37.

Bus Bar 37

As shown in FIGS. 5 and 6, each bus bar 37 is formed by pressing a metal plate into a predetermined shape. As the material of the metal plate, copper, a copper alloy, iron, an iron alloy, aluminum, an aluminum alloy, or the like can be appropriately selected as needed. The bus bar 37 has an elongated shape in the left-right direction when seen from above. A plurality of contact portions 61 (two in this embodiment) that come into contact with the electrode terminals 14 of the power storage device 11 are provided on the lower surface of each bus bar 37.

As shown in FIG. 1, in each bus bar 37, a plurality of through-holes (two in this embodiment) 23A and 23B through which stud bolts 42 are respectively passed are formed penetrating the bus bar 37. The through-holes 23A and 23B each have an oblong shape elongated in the left-right direction.

Nuts (not shown) are screwed onto the stud bolts 42 in a state where the stud bolts 42 are respectively passed through each of the through-holes 23A and 23b, and thus the electrode terminal 14 and the bus bar 37 are electrically connected. The regions around the through-holes 23A and 23B are the above-described contact portions 61.

As shown in FIGS. 5 and 6, a bent portion 60 that is bent upward (in the direction away from the contact portions 61) and extends in the front-rear direction (in the direction intersecting with the alignment direction) is formed in the bus bar 37. The bent portion 60 extends from the front edge portion to the rear edge portion of the bus bar 37. The bent portion 60 has a U-shaped cross section that is open downward. The bent portion 60 may be formed in the same process when the bus bar 37 is pressed, or may be formed in a different process.

As shown in FIG. 6, the bent portion 60 is formed at a position shifted in the left-right direction from the intermediate position between one through-hole 23A and the other through-hole 23B of the bus bar 37. On the upper surface (the surface opposite to the surface on which the contact portions 61 are formed) of the bus bar 37, a first region 63 divided by the bent portion 60 and a second region 64 that has a larger area than the first region 63 are formed. In FIG. 6, the first region 63 is positioned on the left side of the bus bar 37, and the second region 64 is positioned on the right side of the bus bar 37. The bent portion 60 is not included in the first region 63 and the second region 64.

Figure 4:
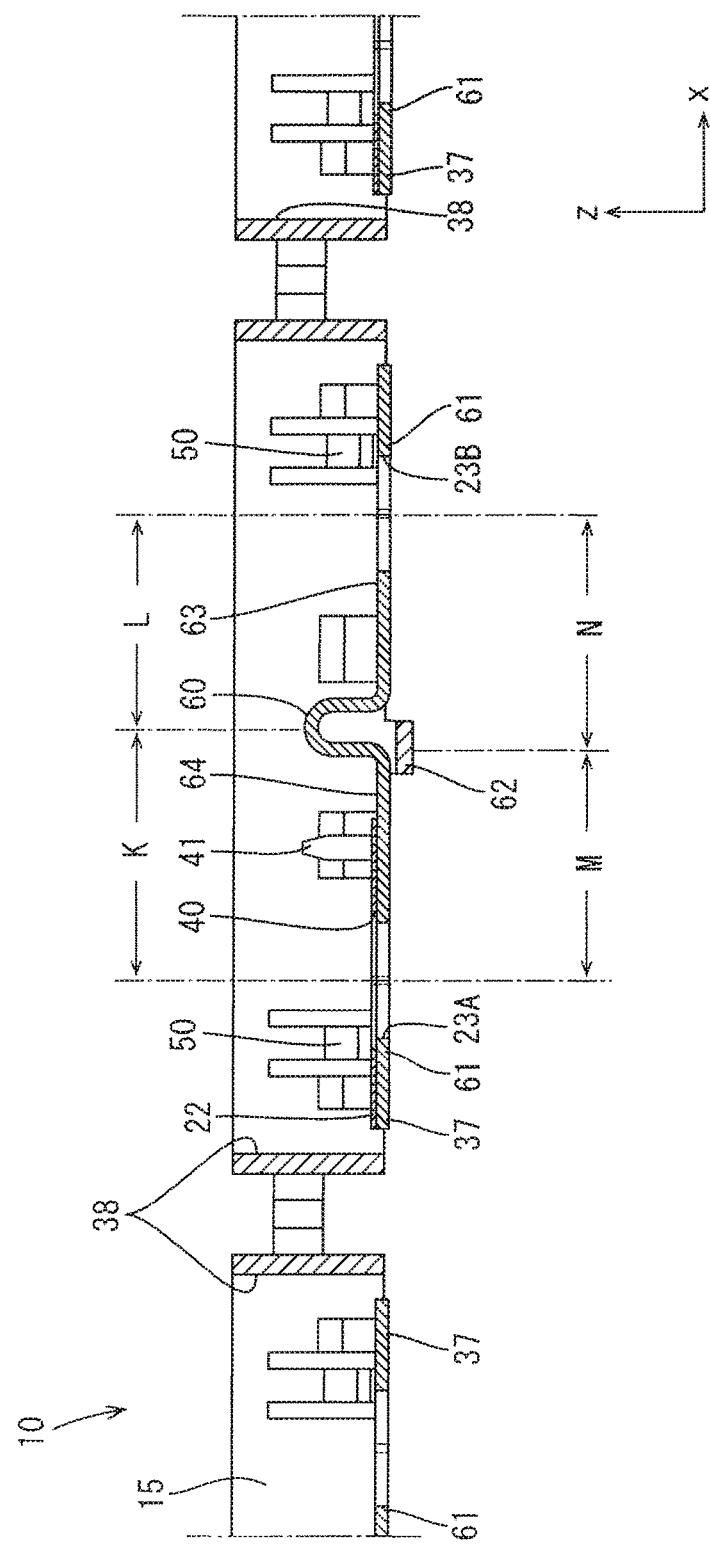
FIG. 4 is a cross-sectional view taken along line IV-IV in FIG. 3.

As shown in FIG. 4, the distance K between the center of the through-hole 23A and the top portion of the bent portion 60 is set longer than the distance L between the center of the through-hole 23B and the top portion of the bent portion 60.

As shown in FIG. 6, a plurality of positioning recesses 39 (three in this embodiment) for positioning the bus bar 37 relative to the bus bar housing portion 38 are formed in the second region 64 of the bus bar 37. The bus bar 37 is positioned in the bus bar housing portion 38 as a result of positioning protrusions 41 formed in the bus bar housing portion 38 being fitted to a corresponding positioning recess 39 (see FIG. 3). One positioning recess 39 is formed in the rear edge portion of the second region 64 of the bus bar 37, and two positioning recesses 39 are formed in the front edge portion of the second region 64 of the bus bar 37.

Insulating Protector 15

Figure 2:
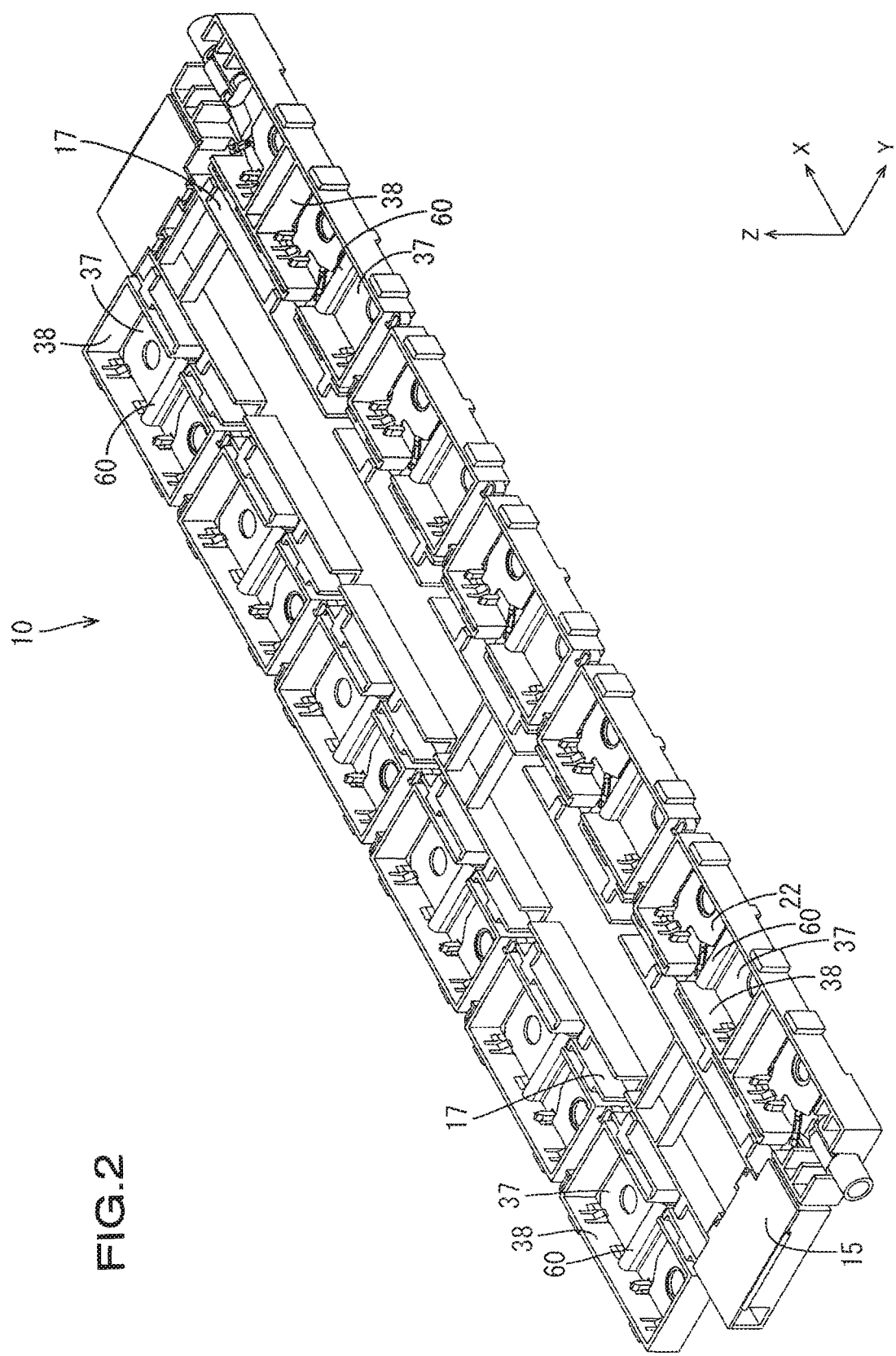
FIG. 2 is a perspective view showing a wiring module.

The insulating protector 15 is made of a synthetic resin with insulating properties, and is formed elongated in the left-right direction. A plurality of bus bar housing portions 38 are formed in the insulating protector 15. As shown in FIG. 2, the plurality of bus bar housing portions 38 are formed side-by-side in a row in the left-right direction at each of the front and rear portions of the insulating protector 15.

Bus Bar Housing Portion 38

Figure 3:
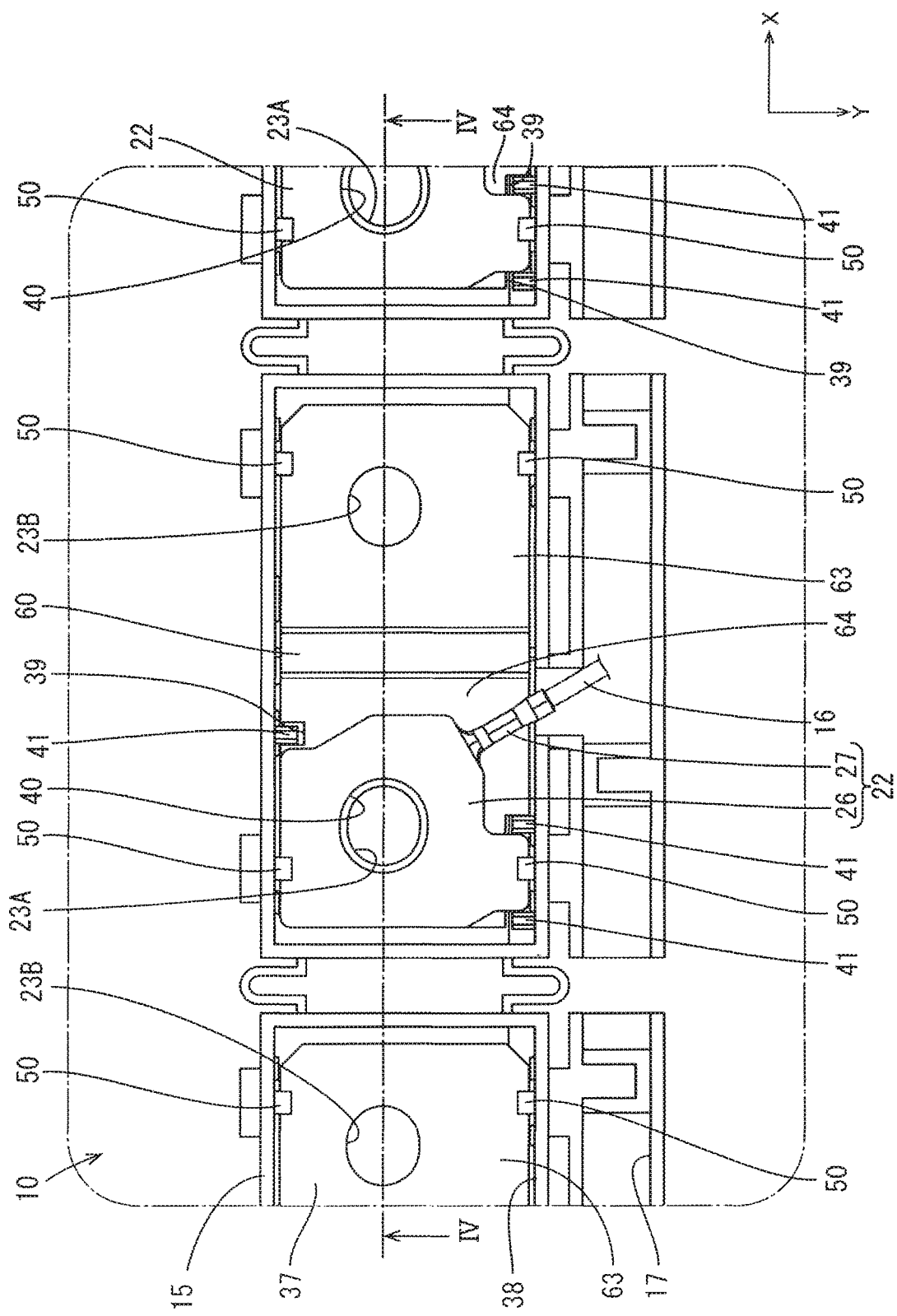
FIG. 3 is a partially enlarged plan view showing the wiring module.

As shown in FIG. 3, each bus bar housing portion 38 has a substantially rectangular shape when seen from above. The bus bar housing portion 38 is formed in a box shape that is open upward, and houses a corresponding bus bar 37. A voltage detection terminal 22 is housed in each of the bus bar housing portions 38 in a state of being placed on the bus bar 37. The bus bar 37 and the voltage detection terminal 22 are held in a state where they are prevented from coming out upward by locking claws 50 provided on the bus bar housing portion 38.

Voltage Detection Terminal 22

Each voltage detection terminal 22 is formed by pressing a metal plate into a predetermined shape. As the material of the metal plate, copper, a copper alloy, iron, an iron alloy, aluminum, an aluminum alloy, or the like can be appropriately selected as needed. The voltage detection terminal 22 includes a bus bar connection portion 26 that has a plate shape, and a wire connection portion 27 that extends from the bus bar connection portion 26.

The bus bar connection portion 26 is provided with a through-hole 40 through which a stud bolt 42 is passed. The voltage detection terminal 22 and the electrode terminal 14 are electrically connected as a result of the bus bar connection portion 26 being sandwiched between a nut and the bus bar 37.

As shown in FIG. 3, the front edge of the bus bar connection portion 26 protrudes forward and is engaged with two positioning protrusions 41 of the bus bar housing portion 38 from the left and right sides. Also, the left rear edge portion of the bus bar connection portion 26 is engaged with the positioning protrusion 41 of the bus bar housing portion 38 from the right side. Thus, the bus bar connection portion 26 is prevented from rotating in the bus bar housing portion 38 as a result of the bus bar connection portion 26 engaging with the positioning protrusions 41 of the bus bar housing portion 38.

Each wire connection portion 27 is crimped to one end of a corresponding voltage detection wire 16. The voltage detection wires 16 are routed in a routing portion 17 that has a groove shape and is provided in the insulating protector 15. The other end portion of each of the voltage detection wires 16 is connected to an external connection device (not shown) such as an ECU (Electronic Control Unit).

Note that the ECU is equipped with a micro computer, elements, and the like, and employs a known configuration equipped with the functions of detecting the voltage, current, temperature, and the like of the power storage devices 11, and controlling charging, discharging, and the like of each of the power storage devices 11.

Beam Portion 62

As shown in FIG. 4, in each bus bar housing portion 38, a beam portion 62 that extends in the front-rear direction (an example of an intersecting direction) and has a plate shape is formed at the lower position of the bus bar 37. The beam portion 62 is formed spanning between the front and rear walls that constitutes the bus bar housing portion 38.

In a state where the bus bar 37 is housed in the bus bar housing portion 38, the beam portion 62 is provided at a position corresponding to the intermediate portion between the centers of the one through-hole 23A and the other through-hole 23B that are formed in the bus bar 37. Thus, the beam portion 62 is arranged at a position shifted from the bent portion 60 in the left-right direction (alignment direction). The contact portions 61 of the bus bar 37 are placed on the upper surface of the beam portion 62.

As shown in FIG. 4, the distance M between the center of the through-hole 23A and the center of the beam portion 62 in the left-right direction and the distance N between the center of the through-hole 23B and the center of the beam portion 62 in the left-right direction are set equal to each other.

Actions and Effects of this Embodiment

Next, the actions and effects of this embodiment will be described. The wiring module 10 according to this embodiment is the wiring module 10 that is arranged on the power storage device group 12 in which the plurality of power storage devices 11 each having the electrode terminals 14 are arranged along the left-right direction (the alignment direction), the wiring module including: the bus bars 17 each connected to a corresponding electrode terminal 14; and the insulating protector 15 that is made of synthetic resin and has the bus bar housing portions 38 each housing the bus bar 37, wherein each bus bar 37 includes: the plurality of contact portions 61 each coming in contact with a corresponding electrode terminal 14; and the bent portion 60 that bends in the direction away from the contact portions and extends in the front-rear direction (intersecting direction that intersects with the alignment direction), the bent portion 60 is formed at a position shifted in the left-right direction (the alignment direction) from the intermediate position between one contact portion 61 of the plurality of contact portions 61 and the other contact portion 61 next to the one contact portion 61, the beam portion 62 on which the bus bar 37 is placed is formed in the bus bar housing portion 38 to extend in the front-rear direction (intersecting direction), and the beam portion 62 is formed at a position shifted from the bent portion 60 in the alignment direction.

Also, the power storage module 13 according to this embodiment includes the power storage device group 12 in which the plurality of power storage devices are arranged in the left-right direction, and the wiring module 10 that is arranged in the power storage device group 12.

With the above-described configuration, the bus bar 37 is placed on the beam portion 62 in a well-balanced manner. Thus, the height positions of the contact portions 61 of the bus bar 37 with respect to the electrode terminal 14 can be set accurately with the beam portion 62. As a result, the reliability of electrical connection between the electrode terminals 14 and the bus bars 37 can be improved.

Also, according to this embodiment, the beam portion 62 is provided at a position corresponding to the intermediate position between the one contact portion 61 and the other contact portion 61 in a state where the bus bar 37 is housed in the bus bar housing portion 38.

With the above-described configuration, the bus bar 37 can be placed on the beam portion 62 in a more balanced manner. Accordingly, the reliability of electrical connection between the electrode terminals 14 and the bus bars 37 can be further improved.

Also, according to this embodiment, each bus bar 37 has the plurality of through-holes 23A and 23B, and the bent portion 60 is formed at a position shifted in the left-right direction from the intermediate position between the center of the one through-hole 23A and the center of the other through-hole 23B positioned next to the one through-hole 23A.

With the above-described configuration, the position of the bent portion 60 in the bus bar 37 can be set with reference to the center positions of the through-holes 23A and 23B, and thus the position accuracy of the bent portion 62 can be improved. As a result, the position accuracy between the bus bars 37 and the beam portions 62 can be improved, and thus the reliability of electrical connection between the electrode terminals 14 and the bus bars 37 can be further improved.

Also, according to this embodiment, the first region 63 and the second region 64 that has a larger area than the first region 63 are formed in the region different from the bent portion 60 on the surface of each bus bar 37 (the surface opposite to the surface on which the contact portions 61 are formed), the voltage detection terminal 22 is placed on the second region 64, and the voltage detection terminal 22 has the bus bar connection portion 26 that is electrically connected to the bus bar 37 and the wire connection portion 16 that extends laterally from the side edge of the bus bar connection portion 26 and is connected to the voltage detection wire 16.

With the above-described configuration, the upper surface of the bus bar 37 (the surface opposite to the surface on which the contact portions are formed) is divided into the first region 63 and the second region 64 that has a larger area than the first region 63 by the bent portion 60. The voltage detection terminal 22 that has a configuration in which the wire connection portion 27 extends laterally from the side edge of the bus bar connection portion 26 can be arranged in each second region 64.

Other Embodiments

The technology disclosed in the present specification is not limited to the embodiment described in the above description with reference to the drawings, and embodiments such as the following also fall within the technical scope of the technology disclosed in the present specification, for example.

(1) In this embodiment, a configuration was employed in which the bus bar 37 connects the electrode terminals 14 of different polarities (the power storage devices are connected in series), but there is no limitation to this, and a configuration may be employed in which the bus bar 37 connects the electrode terminals 14 of the same polarities (the power storage devices are connected in parallel). For example, a configuration may be employed in which another power storage device 11 is connected in parallel to the battery module according to the above-described embodiment and the electrode terminals 14 of the same polarities in this parallel connection are electrically connected.

(2) The voltage detection terminal 22 may be placed on the first region 63.

(3) The power storage device 11 may be a capacitor.

(4) Any number of power storage devices 11 can be selected.

(5) In this embodiment, a configuration was employed in which the bus bar 37 has two through-holes 23A and 23B, but there is no limitation to this, and a configuration may be employed in which the bus bar 37 has three or more through-holes.

(6) In this embodiment, a configuration was employed in which the bus bar 37 has through-holes 23A and 23B, the stud bolt 42 provided on the electrode terminal 14 is passed through a corresponding through-hole 23A or 23B, and the bus bar 37 is screwed with a nut, but there is no limitation to this, and a configuration may be employed in which the bus bar 37 does not have the through-holes 23A and 23B, and the bus bar 37 and the electrode terminal 14 are electrically connected by welding, brazing, or the like. Known methods such as laser welding, ultrasonic welding, resistance welding, or the like can be used as a welding method. Also, known methods such as soldering, brazing, or the like can be used as a brazing method.

LIST OF REFERENCE NUMERALS

10: Wiring module
11: Power storage device
12: Power storage device group
13: Power storage module
14: Electrode terminal
15: Insulating protector
16: Voltage detection wire
22: Voltage detection terminal
23A,23B: Through-hole
26: Bus bar connection portion
27: Wire connection portion
37: Bus bar
38: Bus bar housing portion
61: Contact portion
60: Bent portion
62: Beam portion
63: First region
64: Second region

What is claimed is:

1. A wiring module configured to be arranged on a power storage device group in which a plurality of power storage devices each having electrode terminals are arranged side-by-side along an alignment direction, the wiring module comprising:

bus bars that are connected to the electrode terminals; and an insulating protector that is made of a synthetic resin and has bus bar housing portions in which the bus bars are housed, wherein each of the bus bars has a plurality of contact portions that each come into contact with a corresponding electrode terminal and a bent portion that is bent in a direction away from the contact portions and extends in an intersecting direction that intersects with the alignment direction, each of the bent portions is formed at a position shifted in the alignment direction from an intermediate position between one contact portion of the plurality of contact portions and an adjacent contact portion, and a beam portion on which a corresponding bus bar is placed is formed in each of the bus bar housing portions to extend in the intersecting direction, and the beam portion is formed at a position shifted from the bent portion in the alignment direction.

2. The wiring module according to claim 1, wherein each of the beam portions is provided at a position corresponding to the intermediate position between the one contact portion and the adjacent contact portion in a condition in which the bus bar is housed in the bus bar housing portion.

3. The wiring module according to claim 1, wherein each of the bus bars has a plurality of through-holes, and each of the bent portions is formed at a position shifted in the alignment direction from an intermediate position between the center of one through-hole of the plurality of through-holes and the center of an adjacent through-hole.

4. The wiring module according to claim 1, wherein a first region and a second region that has a larger area than the first region are formed in a region different from the bent portion on a surface of each of the bus bars opposite to the surface on which the contact portions are formed, a voltage detection terminal is placed on each of the second regions, and each of the voltage detection terminals has a bus bar connection portion that is electrically connected to the bus bar and a wire connection portion that extends laterally from a side edge of the bus bar connection portion and is connected to a voltage detection wire.

5. A power storage module, comprising:

a power storage device group in which a plurality of power storage devices each having electrode terminals are arranged along an alignment direction; and the wiring module according to claim 1, which is arranged on the power storage device group.

* * * * *